United States Patent

Kato

[11] Patent Number: 5,848,942
[45] Date of Patent: Dec. 15, 1998

[54] GOLF BALL

[75] Inventor: Akira Kato, Shirakawa, Japan

[73] Assignee: Sumitomo Rubber Industries, Ltd, Hyogo-ken, Japan

[21] Appl. No.: 834,552

[22] Filed: Apr. 4, 1997

[30] Foreign Application Priority Data

Apr. 4, 1996 [JP] Japan ................................ 8-082403

[51] Int. Cl.$^6$ .......................... A63B 37/06; A63B 37/12
[52] U.S. Cl. ............................................. 473/365; 473/377
[58] Field of Search .................................... 473/357, 374, 473/377, 365, 372, 373, 385

[56] References Cited

U.S. PATENT DOCUMENTS 5,439,227  8/1995  Egashira et al. ..................... 473/374 X
5,445,387  8/1995  Maruko et al. ...................... 473/357 X

FOREIGN PATENT DOCUMENTS 0674923   10/1995   European Pat. Off. .
2299275   10/1996   United Kingdom .
2301291   12/1996   United Kingdom .
2307865    6/1997   United Kingdom .

Primary Examiner—George J. Marlo
Attorney, Agent, or Firm—Birch, Stewart, Kolasch & Birch, LLP

[57] ABSTRACT

A golf ball which maintains a good shot feel and attains a long flight distance which comprises a solid center, a thread rubber layer formed by winding a thread rubber around the solid center and a cover formed on the thread rubber layer, wherein the solid center has a diameter of 30 to 38 mm and a surface hardness, measured by a JIS-C hardness tester, of 40 to 80, the difference in hardness between the center and surface of the solid center being within 5, the cover being formed of a base resin containing an ionomer resin as a main component and the cover having a flexural modulus of 300 to 600 MPa and a hardness, measured by a Shore D-scale hardness tester, of 60 to 80.

2 Claims, 1 Drawing Sheet

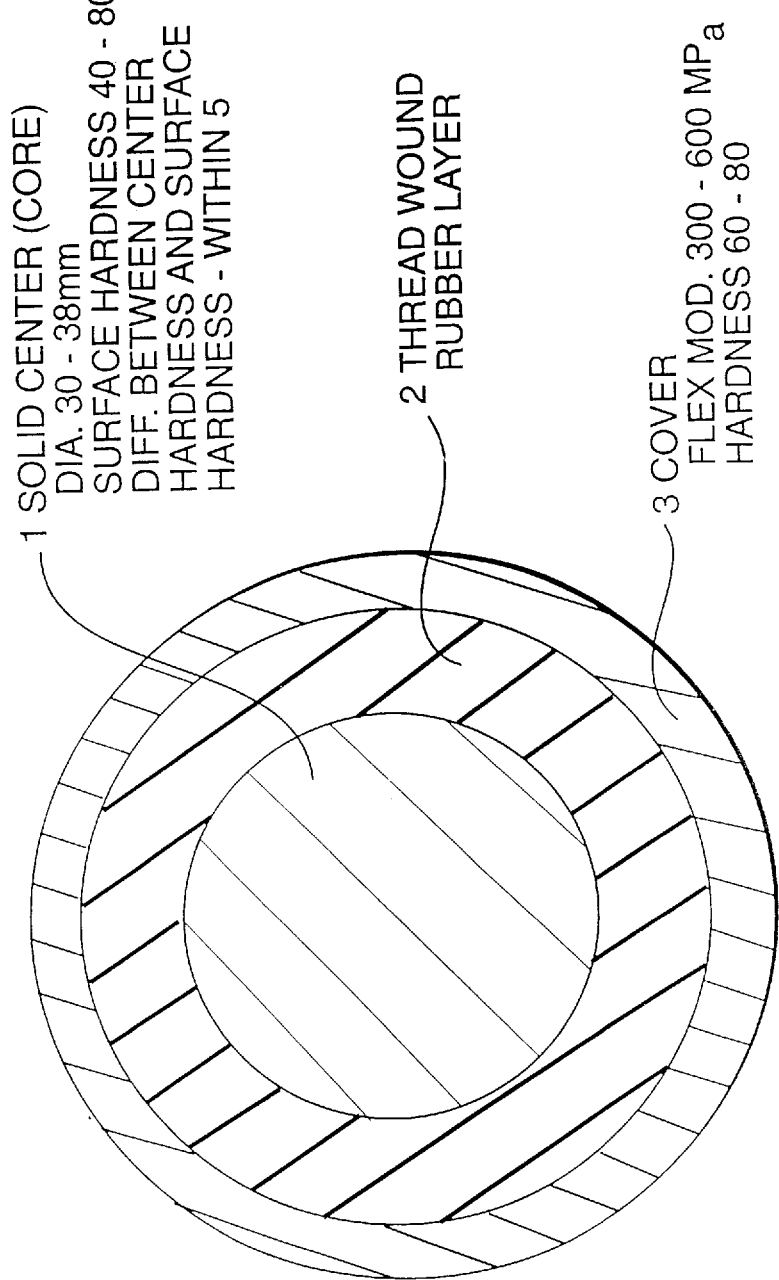

GOLF BALL

FIELD OF THE INVENTION

The present invention relates to a golf ball which maintains good shot feel and attains long flight distance.

BACKGROUND OF THE INVENTION

In the prior art, there are mainly two types of golf balls. One is a solid golf ball, such as a two-piece golf ball, etc. which is composed of a core made of an integrally molded rubber member and a thermoplastic resin cover made of an ionomer resin formed on the core. The other is a multi-layer golf ball having a thread rubber layer which is produced by winding a thread rubber around a solid or liquid center to form the thread rubber layer, followed by covering the periphery of the thread rubber layer with a cover layer. In the multi-layer golf ball having a thread rubber layer, those using a balata cover and a liquid center have been widely used as a golf ball for advanced golfers and professional golfers because of their excellent shot feel and controllability. However, the conventional multi-layer golf ball having a thread rubber layer has a problem that the spin amount is larger than that of the two-piece solid golf ball using a solid core and thus the launch angle is small and, therefore, the flight distance is small.

OBJECTS OF THE INVENTION

Accordingly, the present invention is directed to simultaneously satisfying the shot feel and flight performance of the golf ball. As a result, the above performance can be accomplished by using a golf ball center having a diameter of 30 to 38 mm, with the difference in hardness between the center and the surface of the solid center being within 5, a thread rubber layer, and a cover having a hardness (measured by a Shore D-scale hardness tester) of 60 to 80 and a flexural modulus of 300 to 600 MPa.

The main object of the present invention is to solve the above problems of a conventional multi-layer golf ball having a thread rubber layer, thereby providing a golf ball which maintains the good shot feel peculiar to the multi-layer golf ball having a thread rubber layer while attaining long flight distance which is equal to that of the two-piece golf ball.

This object as well as other objects and advantages of the present invention will become apparent to those skilled in the art from the following description.

SUMMARY OF THE INVENTION

The present invention relates to a golf ball comprising a solid center 1, a thread rubber layer 2 formed by winding a thread rubber around the solid center and a cover 3 formed on the thread rubber layer, the solid center having a diameter of 30 to 38 mm and a surface hardness (measured by a JIS-C hardness tester) of 40 to 80, the difference in hardness between the solid center and the surface of the solid center being within 5, the cover being formed of a base resin containing an ionomer resin as a main component, and having a flexural modulus of 300 to 600 MPa and a hardness (measured by a Shore D-scale hardness tester) of 60 to 80. The term "golf ball" used herein means a multi-layer structure having a thread rubber layer, comprising a solid center, a thread rubber layer and a cover, as described above.

BRIEF DESCRIPTION OF THE DRAWINGS

The present invention will become more fully understood from the detailed description given hereinbelow and the accompanying drawings which are given by way of illustration only, and thus are not limitative of the present invention, and wherein the FIGURE diagrammatically shows the golf ball structures of the present invention.

DETAILED DESCRIPTION OF THE INVENTION

The diameter of the solid center used as the ball center of the present invention is from 30 to 38 mm and the difference in hardness (measured by a JIS-C hardness tester) between the center and the surface of the solid center is within 5 and, the surface hardness (measured by a JIS-C hardness tester) of the solid center is from 40 to 80. When the diameter of the solid center is smaller than 30 mm, the spin amount when hitting increases and flight performance is deteriorated. On the other hand, when the diameter of the solid center exceeds 38 mm, the thread rubber layer becomes thinner and the rebound characteristics of the thread rubber are not exhibited. Therefore, the flight distance decreases. When the difference in hardness (measured by a JIS-C hardness tester) between the center and surface of the solid center is not less than 5, the rebound characteristics of the golf ball deteriorates and the flight distance decreases. When the hardness of the solid center is less than 40, the rebound characteristics of the golf ball deteriorate. On the other hand, when it exceeds 80, the shot feel is inferior.

The rubber for the solid center is not specifically limited, but polybutadiene having high rebound characteristics, particularly high-cis polybutadiene is preferred. In the preparation of the rubber composition for the solid center, it is preferred to use high-cis polybutadiene as the rubber component:

As the thread rubber for winding around the solid center, there may be used the same one as has been used heretofore. For example, there may be used those obtained by vulcanizing a rubber composition prepared by formulating sulfur, a vulcanization aid, a vulcanization accelerator, an antioxidant, etc. with natural rubber or a mixture of natural rubber and a synthetic rubber, e.g. polyisoprene.

The hardness (measured by a Shore D-scale hardness tester) of the cover in the present invention is from 60 to 80 and the flexural modulus is from 300 to 600 MPa. When the hardness is smaller than 60 and the flexural modulus is smaller than 300 MPa, not only the rebound characteristics of the golf ball are adversely affected, but also the spin amount at the time of hitting increases. Therefore, the ball trajectory is elevated up by air resistance and thus the flight distance is correspondingly decreased. On the contrary, when the hardness exceeds 80 or the flexural modulus exceeds 600 MPa, the shot feel is poor.

The cover of the present invention can be made of a high-rigid resin having a hardness (measured by a Shore D-scale hardness tester) of 60 to 80 and a flexural modulus of 300 to 600 MPa, e.g., an ionomer resin obtained by neutralizing at least a portion of the carboxyl groups in a copolymer of α-olefin and α,β-unsaturated carboxylic acid having 3 to 8 carbon atoms with a metallic ion, and mixture thereof. As the above ionomer resin, those prepared by neutralizing at least a portion of the carboxyl groups in a copolymer of ethylene and (meth)acrylic acid with a metallic ion are preferred, and those prepared by neutralizing 5 to 80% of a carboxyl groups with a metallic ion are particularly preferred. Specific examples thereof include high-rigid grade ionomer resins which are commercially available from Mitsui Du Pont Polychemical Co., Ltd. under the trade name of Hi-milan 1605 (Na), Hi-milan 1707 (Na), Hi-milan AM7318 (Na), Hi-milan AM7315 (Zn) and Hi-milan AM7317 (Zn); high-rigid grade ionomer resins which are commercially available from Du Pont Co., U.S.A. under the trade name of Surlyn 8940 (Na), Surlyn 8920 (Na) and Surlyn 7940 (Li); and high-rigid grade ionomer resins which are commercially available from Exxon Chemical Co. under the trade name of Iotek 8000 (Na). Incidentally, Na, Zn, K, Li, etc., which are described in parenthesis following the trade name of the above ionomer resins, is the identification of the particular neutralizing metal ion species utilized.

Thermoplastic resins such as a polyolefin (e.g. polyethylene, polypropylene, etc.) and a polyamide may be added to the ionomer resin.

Various additives such as pigments, dispersants, antioxidants, ultraviolet absorbers, light stabilizers, etc. may be optionally added to the cover used in the present invention, in addition to the above mixture.

The method of covering the golf ball with a cover is not specifically limited, and a conventional method can be used. For example, there can be used the method of molding the composition for the cover into a semi-spherical half-shell, in advance, covering the core with two half-shells, followed by pressure-molding at 130° to 170° C. for 1 to 5 minutes, or a method of Injection molding the cover composition directly on the core to cover the core. At the time of the cover molding, dimples are optionally formed on the surface of the golf ball. After the cover is molded, painting, stamping, etc. may be optionally provided.

The present invention provides a golf ball which maintains good shot feel and attains a long flight distance by respectively setting the diameter of the center, difference in hardness between the center and the surface of the center, the surface hardness of the center and the cover hardness within a specific range, using the above formulation.

EXAMPLES

The following Examples and Comparative Examples further illustrate the present invention in detail but are not to be construed to limit the scope thereof.

Examples 1 to 5 and Comparative Examples 1 to 5
(Production of thread wound core)

By using the composition and vulcanization conditions shown in the following Table 1, each solid center was produced. The unit of the amount of the respective components formulated in Table 1 was represented by "parts by weight". Then, a thread rubber made of a blend rubber, wherein a base rubber is a natural rubber/a low-cis Isoprene rubber (trade name: Shell IR-309, manufactured by Shell Chemistry Co., Ltd.) in weight ratio of 70:30, was wound around the solid center to produce a thread wound core having an outer diameter of about 39.0 mm, respectively.

TABLE 1

| | | Solid center | | | |
|---|---|---|---|---|---|
| | | A | B | C | D |
| Formulation | BR11 (Note 1) | 100 | 100 | 100 | 100 |
| | Zinc acrylate | 20 | 20 | 20 | 20 |
| | Dicumyl peroxide | 1.5 | 1.5 | 1.5 | 1.5 |
| | Zinc oxide | 15 | 15 | 15 | 15 |
| | Barium sulfate | 84 | 40 | 40 | 11 |
| | Antioxidant (Note 2) | 0.5 | 0.5 | 0.5 | 0.5 |
| Vulcanization conditions | | 145° C. × 24 minutes 165° C. × | 145° C. × 24 minutes 165° C. × | 165° C. × 20 minutes | 145° C. × 24 minutes 165° C. × |

TABLE 1-continued

| | | Solid center | | | |
|---|---|---|---|---|---|
| | | A | B | C | D |
| Solid center | Diameter) (mm) | 8 minutes 28.0 | 8 minutes 34.0 | 34.0 | 8 minutes 38.5 |
| Weight (g) | | 17.5 | 27.0 | 27.0 | 34.5 |
| Hardness distribution | Center | 68 | 68 | 62 | 68 |
| | Position which is 5 mm away from the center | 68 | 68 | 65 | 68 |
| | Position which is 10 mm away from the center | 68 | 68 | 68 | 68 |
| | Position which is 15 mm away from the center | — | 68 | 72 | 68 |
| | Surface | 67 | 68 | 72 | 67 |

(Note 1): Hi-cis polybutadiene (content of 1,4-cis-polybutadiene: 96%) manufactured by Japan Synthetic Rubber Co., Ltd.
(Note 2): Noclak NS-6 (2,5-di-t-butylhydroquinone, manufactured by Ohuchi Shinko Kagaku Kogyo Co., Ltd.)

(Preparation of composition for cover)

A pelletized composition for cover was obtained by mixing formulation materials of a composition shown in the following Table 2 using a twin-screw kneading extruder. The unit of the amount of the respective components formulated in Table 2 was represented by "parts by weight".

The extrusion conditions are as follows: a screw diameter: 45 mm; a screw revolution per minute: 200 rpm; a screw L/D: 35. The formulation materials were heated at 200° to 260° C. at the die position of the extruder. The flexural modulus was measured according to ASTM-747 after a heat-press molded sheet having a thickness of about 2 mm was preserved at 23° C. for two weeks. The hardness of the cover was measured by a Shore D-scale hardness tester after laminating three or more sheets.

TABLE 2

| Cover | | a | b | c | d | e | f |
|---|---|---|---|---|---|---|---|
| Formulation of cover | Hi-milan 1605 (Note 3) | 50 | | | | | 25 |
| | Hi-milan 1557 (Note 4) | | | | | | 25 |
| | Hi-milan 1855 (Note 5) | | | | | | 50 |
| | Hi-milan 1706 (Note 6) | 50 | | 80 | | | |
| | Hi-milan AM7317 (Note 7) | | 50 | | 50 | | |
| | Hi-milan AM7318 (Note 8) | | 50 | | | | |
| | Surlyn 7930 (Note 9) | | | | 50 | | |
| | Iotek 8000 (Note 10) | | | | | 60 | |
| | Iotek 7010 (Note 11) | | | | | 40 | |
| | Glylax R-500 (Note 12) | | | 20 | | | |
| | Titanium | 2 | 2 | 2 | 2 | 2 | 2 |

TABLE 2-continued

| Cover | | a | b | c | d | e | f |
|---|---|---|---|---|---|---|---|
| | dioxide | | | | | | |
| | Barium sulfate | 2 | 2 | 2 | 2 | 2 | 2 |
| Characteristics | Hardness of cover (Shore D-scale hardness) | 63 | 66 | 70 | 66 | 66 | 58 |
| | Flexural modulus | 350 | 420 | 580 | 400 | 410 | 220 |

(Note 3): Ethylene-methacrylic acid ionomer resin obtained by neutralizing with sodium ion, manufactured by Mitsui Du Pont Polychemical Co., Ltd., MI: 2.8, flexural modulus: about 310 MPa, Shore D-scale hardness: 62
(Note 4): Ethylene-methacrylic acid ionomer resin obtained by neutralizing with zinc ion, manufactured by Mitsui Du Pont Polychemical Co., Ltd., MI: 5.0, flexural modulus: about 230 MPa
(Note 5): Ethylene-butyl acrylate-methacrylic acid terpolymer ionomer resin obtained by neutralizing with zinc ion, manufactured by Mitsui Du Pont Polychemical Co., Ltd., MI: 1.0, flexural modulus: about 90 MPa
(Note 6): Ethylene-methacrylic acid ionomer resin obtained by neutralizing with zinc ion, manufactured by Mitsui Du Pont Polychemical Co., Ltd., MI: 0.8, flexural modulus: about 260 MPa, Shore D-scale hardness: 61
(Note 7): Ethylene-methacrylic acid ionomer resin obtained by neutralizing with zinc ion, manufactured by Mitsui Du Pont Polychemical Co., Ltd., MI: 1.1, flexural modulus: about 310 MPa, Shore D-scale hardness: 62
(Note 8): Ethylene-methacrylic acid ionomer resin obtained by neutralizing with sodium ion, manufactured by Mitsui Du Pont Polychemical Co., Ltd., MI: 2.1, flexural modulus: about 350 MPa, Shore D-scale hardness: 65
(Note 9): Ethylene-methacrylic acid ionomer resin obtained by neutralizing with lithium ion, manufactured by Du Pont Co., content of methacrylic acid: about 15% by weight, lithium ion neutralization degree: about 50 molar %, MI: 1.8, flexural modulus: about 335 MPa, Shore D-scale hardness: 63
(Note 10): Ethylene-acrylic acid ionomer resin obtained by neutralizing with sodium ion, manufactured by Exxon Chemical Co., MI: 0.8, flexural modulus: about 370 MPa, Shore D-scale hardness: 57
(Note 11): Ethylene-acrylic acid ionomer resin obtained by neutralizing with zinc ion, manufactured by Exxon Chemical Co., MI: 0.8, flexural modulus: about 160 MPa, Shore D-scale hardness: 57
(Note 12): Polyamide elastomer, manufactured by Dainippon Ink & Chemicals, Inc.

(Production of golf ball)

The semi-spherical half-shells were molded from the above composition for cover and the above thread wound core was covered with two half-shells, followed by press-molding in a mold for ball and further painting on the surface to produce a thread wound golf ball having an outer diameter of 42.8 mm. The flight performance and impact force of the resulting thread wound golf ball were measured. The flight performance and impact force of the golf balls of Examples 1 to 5 and those of the golf balls of Comparative Examples 1 to 5 are respectively shown in Table 3 and Table 4, together with the solid center and composition for cover used in the production of the golf balls. Comparative Example 1 is an example wherein a diameter of the solid center is small, e.g. 28 mm, while Comparative Example 2 is an example wherein a diameter of the solid center is large, e.g. 38.5 mm. Comparative Example 3 is an example wherein a difference in JIS-C hardness of the solid center is not less than 5 and Comparative Example 4 is an example wherein the hardness of the cover and flexural modulus are not within the range of the present invention. Comparative Example 5 is an example of a two-piece golf ball which is commercially available from Sumitomo Rubber Industries Co., Ltd. The flight performance and impact force were measured in the following manner.

(Test method)

(1) Flight performance 1

It was measured by hitting a golf ball at a head speed of 45 m/second, using a No. 1 wood club (driver) mounted to a Swing robot manufactured by True Temper Co.

(2) Flight performance 2

It was measured by hitting a golf ball at a head speed of 38 m/second, using a No. 5 iron club mounted to a Swing robot manufactured by True Temper Co.

(3) Impact force

It was measured by hitting a golf ball at a head speed of 45 m/second, using a No. 1 wood club wherein an acceleration pickup is mounted to the rear part, measuring an acceleration produced in the direction which is opposite to the forward direction of the head, and converting the maximum value of this acceleration Into a force. Each numeral value was indicated by an index in case of the impact value of the two-piece golf ball being 100. That is, the smaller this numeral value, the smaller the impact force.

(Test results)

TABLE 3

| Example No. | 1 | 2 | 3 | 4 | 5 |
|---|---|---|---|---|---|
| Formulation of solid center | B | B | B | B | B |
| Formulation of cover | a | b | c | d | e |
| Flight performance 1 (W#1) | | | | | |
| Ball initial velocity (m/sec) | 64.6 | 64.8 | 64.9 | 64.7 | 64.7 |
| Launch angle (degree) | 11.20 | 11.30 | 11.33 | 11.25 | 11.25 |
| Spin amount (rpm) | 2650 | 2600 | 2580 | 2630 | 2620 |
| Carry (yard) | 226.0 | 227.0 | 227.3 | 226.3 | 226.5 |
| Flight performance 2 (I#5) | | | | | |
| Ball initial velocity (m/sec) | 55.1 | 55.3 | 55.4 | 55.2 | 55.3 |
| Launch angle (degree) | 14.55 | 14.65 | 14.68 | 14.80 | 14.65 |
| Spin amount (rpm) | 4200 | 4100 | 4050 | 4150 | 4120 |
| Carry (yard) | 185.5 | 186.1 | 186.3 | 185.7 | 185.8 |
| Impact force | 85 | 89 | 91 | 87 | 88 |
| Shot feel | ○ | ○ | ○ | ○ | ○ |

TABLE 4

| Comparative Example No. | 1 | 2 | 3 | 4 | 5 |
|---|---|---|---|---|---|
| Formulation of solid center | A | D | C | B | Two piece ball sold by Sumitomo Rubber Industries Ltd. |
| Formulation of cover | a | a | a | f | |
| Flight performance (W#1) | | | | | |
| Ball initial velocity (m/sec) | 64.5 | 63.1 | 64.0 | 63.5 | 64.6 |
| Launch angle (degree) | 10.55 | 11.35 | 11.20 | 11.10 | 11.30 |
| Spin amount (rpm) | 3010 | 2580 | 2600 | 2750 | 2550 |
| Carry (yard) | 222.0 | 220.5 | 223.0 | 221.5 | 226.3 |
| Flight performance 2 (I#5) | | | | | |
| Ball initial velocity (m/sec) | 55.1 | 54.0 | 54.5 | 54.3 | 55.3 |
| Launch angle (degree) | 13.60 | 14.70 | 14.60 | 14.40 | 14.70 |
| Spin amount (rpm) | 4750 | 4080 | 4150 | 4600 | 4050 |
| Carry (yard) | 182.3 | 182.0 | 182.5 | 181.8 | 185.8 |
| Impact force | 82 | 86 | 84 | 83 | 100 |
| Shot feel | ○ | ○ | ○ | ○ | X |

As is apparent from Table 3 and Table 4, the golf balls of the Examples are superior in rebound force to those of the Comparative Examples and attain the flight distance which is equivalent to or larger than that of the two-piece golf balls. The shot feel of the two-piece golf ball is hard, while the shot feel of the golf balls of the Examples is soft and good. This is also apparent from the fact that the impact fore is smaller than that of the two-piece golf ball.

With respect to the golf balls of the Comparative Example 1, the launch angle is small because of small center diameter and a blowing trajectory is obtained because of large spin amount. Therefore, sufficient flight distance is not attained. With respect to the golf ball of Comparative Example 4, the rebound characteristics of the golf ball are poor because of too soft cover and sufficient flight distance is not attained because of excess spinning.

What is claimed is:

1. A golf ball comprising a solid center, a thread rubber layer formed by winding a thread rubber around said solid center and a cover formed on the thread rubber layer, the solid center having a diameter of 30 to 38 mm and a surface hardness, measured by a JIS-C hardness tester, of 40 to 80, the difference in hardness between the center and surface of the solid center being within 5, the cover being formed of a base resin containing an ionomer resin as a main component, the cover having a flexural modulus of 300 to 600 MPa and a hardness, measured by a Shore D-scale hardness tester, of 60 to 80.

2. The golf ball according to claim 1, wherein the acid content of the ionomer resin is from 5 to 30% by weight and 5 to 80% of the carboxyl groups is neutralized with a metallic ion.

* * * * *